US009831500B2

(12) United States Patent
Lee et al.

(10) Patent No.: US 9,831,500 B2
(45) Date of Patent: Nov. 28, 2017

(54) POROUS ELECTRODE ACTIVE MATERIAL AND SECONDARY BATTERY INCLUDING THE SAME

(71) Applicants: LG Chem, Ltd., Seoul (KR); UNIST (ULSAN NATIONAL INSTITUTE OF SCIENCE AND TECHNOLOGY), Ulsan (KR)

(72) Inventors: Yong Ju Lee, Daejeon (KR); Soo Jin Park, Ulsan (KR); Dong Sub Jung, Daejeon (KR); Hye Ran Jung, Daejeon (KR); Jung In Lee, Gyeonggi-do (KR); Je Young Kim, Daejeon (KR); Jae Phil Cho, Gyeonggi-do (KR)

(73) Assignees: LG Chem, Ltd. (KR); UNIST (Ulsan National Institute of Science and Technology) (KR)

( * ) Notice: Subject to any disclaimer, the term of this patent is extended or adjusted under 35 U.S.C. 154(b) by 0 days.

(21) Appl. No.: 15/341,472

(22) Filed: Nov. 2, 2016

(65) Prior Publication Data
US 2017/0077506 A1    Mar. 16, 2017

Related U.S. Application Data

(62) Division of application No. 13/566,553, filed on Aug. 3, 2012, now Pat. No. 9,512,523.

(30) Foreign Application Priority Data

Apr. 19, 2012 (KR) .......................... 10-2012-0041083
Jul. 13, 2012 (KR) .......................... 10-2012-0076953

(51) Int. Cl.
*H01M 4/04* (2006.01)
*H01M 4/48* (2010.01)
(Continued)

(52) U.S. Cl.
CPC ............. *H01M 4/483* (2013.01); *C23C 18/54* (2013.01); *H01M 4/485* (2013.01); *H01M 4/625* (2013.01); *Y02E 60/122* (2013.01)

(58) Field of Classification Search
None
See application file for complete search history.

(56) References Cited

U.S. PATENT DOCUMENTS 5,395,711 A    3/1995   Tahara et al.
5,948,713 A    9/1999   Smiley et al.
(Continued)

FOREIGN PATENT DOCUMENTS

CN    102157731 A    8/2011
CN    102214823 A    10/2011
(Continued)

OTHER PUBLICATIONS

Supplementary European Search Report, EP 06798879, dated Dec. 3, 2009.
(Continued)

*Primary Examiner* — Lucas J. O'Donnell
(74) *Attorney, Agent, or Firm* — Lerner, David, Littenberg, Krumholz & Mentlik, LLP

(57) ABSTRACT

Provided are an electrode active material having a plurality of pores and a secondary battery including the same, and more particularly, a porous electrode active material including silicon-based oxide expressed by $SiO_x$ ($0.5 \leq x \leq 1.2$) and having a Brunauer, Emmett, and Teller (BET) specific surface area ranging from 2 $m^2/g$ to 100 $m^2/g$, and a secondary battery including a cathode including a cathode active material, a separator, an anode including an anode active material, and an electrolyte, in which the anode active material includes a porous electrode active material including silicon-based oxide expressed by $SiO_x$ ($0.5 \leq x \leq 1.2$) and
(Continued)

(a)

(b)

having a BET specific surface area ranging from 2 m²/g to 100 m²/g.

5 Claims, 2 Drawing Sheets

(51) Int. Cl.
  *H01M 4/485* (2010.01)
  *C23C 18/54* (2006.01)
  *H01M 4/62* (2006.01)

(56) References Cited

U.S. PATENT DOCUMENTS

| | | | |
|---|---|---|---|
| 6,028,127 | A | 2/2000 | Yanagase et al. |
| 6,936,643 | B1 | 8/2005 | Joussen et al. |
| 9,196,896 | B2 * | 11/2015 | Jung ............... C23C 18/54 |
| 2003/0118905 | A1 | 6/2003 | Fukuoka et al. |
| 2003/0215711 | A1 | 11/2003 | Aramata et al. |
| 2004/0033419 | A1 | 2/2004 | Funabiki |
| 2006/0068287 | A1 | 3/2006 | Morita et al. |
| 2007/0004824 | A1 | 1/2007 | Kim et al. |
| 2007/0049658 | A1 | 3/2007 | Choi |
| 2007/0224508 | A1 | 9/2007 | Aramata et al. |
| 2007/0243369 | A1 | 10/2007 | Park et al. |
| 2008/0145757 | A1 | 6/2008 | Mah et al. |
| 2008/0268338 | A1 | 10/2008 | Lee et al. |
| 2009/0311606 | A1 | 12/2009 | Fukuoka et al. |
| 2010/0112442 | A1 | 5/2010 | Fujikawa et al. |
| 2010/0243951 | A1 | 9/2010 | Watanabe et al. |
| 2011/0020536 | A1 | 1/2011 | Yamamoto et al. |
| 2011/0204489 | A1 * | 8/2011 | Lin ............... H01L 21/0337 257/629 |
| 2011/0244333 | A1 | 10/2011 | Kawada |
| 2011/0244334 | A1 | 10/2011 | Kawada |
| 2011/0281164 | A1 | 11/2011 | Lee et al. |
| 2012/0100438 | A1 | 4/2012 | Fasching et al. |
| 2012/0231326 | A1 | 9/2012 | Biswal et al. |
| 2013/0122717 | A1 | 5/2013 | Green et al. |
| 2013/0209883 | A1 * | 8/2013 | Park ............... H01M 4/0471 429/218.1 |
| 2014/0030599 | A1 | 1/2014 | Lee et al. |
| 2014/0030602 | A1 * | 1/2014 | Park ............... H01M 4/386 429/231.95 |

FOREIGN PATENT DOCUMENTS

| | | | | |
|---|---|---|---|---|
| CN | 102214824 | A | 10/2011 | |
| DE | 19920719 | A1 | 11/2000 | |
| EP | 0362884 | A2 | 4/1990 | |
| EP | 0814066 | A1 | 12/1997 | |
| EP | 1363341 | A2 | 11/2003 | |
| EP | 1978580 | A1 | 10/2008 | |
| EP | 2416410 | A2 | 2/2012 | |
| JP | H06325765 | A | 11/1994 | |
| JP | 08208711 | A | 8/1996 | |
| JP | 09188555 | A | 7/1997 | |
| JP | 11-343156 | A | 12/1999 | |
| JP | 2001089213 | A | 4/2001 | |
| JP | 2001-205750 | A | 7/2001 | |
| JP | 2002-042809 | A | 2/2002 | |
| JP | 3685116 | B2 | 4/2003 | |
| JP | 2003-317717 | A | 11/2003 | |
| JP | 2004-047404 | A | 2/2004 | |
| JP | 2004-071542 | A | 3/2004 | |
| JP | 2004323284 | A | 11/2004 | |
| JP | 2004335195 | A | 11/2004 | |
| JP | 3648592 | B2 | 5/2005 | |
| JP | 2005209469 | A | 8/2005 | |
| JP | 2005-310759 | A | 11/2005 | |
| JP | 2010-225494 | A | 10/2010 | |
| JP | 2011-076788 | A | 4/2011 | |
| JP | 2012082126 | A | 4/2012 | |
| JP | 2013509687 | A1 | 3/2013 | |
| KR | 20000009774 | A | 2/2000 | |
| KR | 10-0376605 | B1 | 3/2003 | |
| KR | 2004-0059913 | B1 | 7/2004 | |
| KR | 10-0491874 | B1 | 5/2005 | |
| KR | 100555441 | B1 | 2/2006 | |
| KR | 100562634 | B1 | 3/2006 | |
| KR | 2009-0129504 | A | 12/2009 | |
| KR | 101114492 | B1 * | 2/2012 | ............ H01M 4/134 |
| WO | WO 02079085 | A2 * | 10/2002 | ......... G01N 21/6489 |
| WO | 2009119093 | A1 | 10/2009 | |
| WO | 2011124893 | A2 | 10/2011 | |
| WO | 2012126338 | A1 | 9/2012 | |

OTHER PUBLICATIONS

Office Action from Taiwanese Application No. 96101153 citing search report with a completeion date of Jul. 29, 2010.

Lee et al., "Chemical-Assisted Thermal Disproportionation of Porous Silicon Monoxide into Silicon-Based Muticomponent Systems", Angewandte Chemie International Edition, 2012, 51, 2767-2771.

Kim et al. "Three-Dimensional Porous Silicon Prticles for Use in High-Performance Lithium Secondary Batteries," Angewandte Chem., 2008, 120, pp. 10305-10308.

Veluchamy et al., "Improvement of cycle behavior of SiO/C anode composite by thermochemically generated Li4SiO4 inert phase for lithium batteries," Journal of Power Sources 188 (2009) pp. 574-577.

X-Ray Diffraction Table: Minerals Arranged by X-Ray Powder Diffraction. Mineralogy Database. WebMineral.com. Web. Accessed on: May 16, 2014. >http://webmineral.com/MySQL/xray.php?ed1=4.05&minmax=2#.U3aZGfldWI8<.

Tabuchi et al.—Li-doping Process for LixSIO Negative Active Material Synthesized by Chemical Method for Lithium-Ion Cells, Available Online Jun. 2005, Journal of Power Sources, 146, 507-509.

Lee, Jung-In et al, "Highly stable Si-based multicomponent anodes for practical use in lithium-ion batteries." Energy & Environmental Science, 2012, 5, 7878-7882.

Bang, Byong Man et al., "Scalable approach to multi-dimensional bulk Si anodes via metal-assisted chemical etching," Energy and Environmental Science, 2011, 4, 5013-5019.

Chinese Office Action for Application No. 201210276140.2 dated Apr. 3, 2015.

"Cirstobalite Mineral Data". WebMineral.com. Accessed on: Nov. 29, 2015. <http://webmineral.com/data/Cristobalite.shtml#.Vlum9PIViQI>.

U.S. Appl. No. 13/566,479, filed Aug. 3, 2012.
U.S. Appl. No. 13/566,599, filed Aug. 3, 2012.

* cited by examiner (a)

(b)

POROUS ELECTRODE ACTIVE MATERIAL AND SECONDARY BATTERY INCLUDING THE SAME

CROSS-REFERENCE TO RELATED APPLICATIONS

This application is a divisional application of U.S. patent application Ser. No. 13/566,553, filed on Aug. 3, 2012, and claims the priority of Korean Patent Application No. 10-2012-0041083 filed on Apr. 19, 2012, and Korean Patent Application No. 10-2012-0076953, filed on Jul. 13, 2012, in the Korean Intellectual Property Office, the disclosures of which are incorporated herein by reference.

BACKGROUND OF THE INVENTION

Field of the Invention

The present invention relates to a porous electrode active material and a secondary battery including the same.

Description of the Related Art

Lithium secondary batteries recently have received most attention due to their high energy density and long lifetime. Typically, a lithium secondary battery includes an anode formed of a carbon material or lithium metal alloy, a cathode formed of lithium metal oxide, and an electrolyte having a lithium salt dissolved in an organic solvent.

Lithium metal is initially used as an anode active material constituting an anode electrode of a lithium secondary battery. However, since lithium may have low reversibility and safety, a carbon material is currently mainly used as the anode active material of the lithium secondary battery. The carbon material may have capacity lower than that of metal, but the carbon material may have low changes in volume and excellent reversibility, and may be favorable in terms of price.

However, demand for high-capacity lithium secondary batteries has gradually increased as the use of lithium secondary batteries has been increased. Accordingly, a high-capacity electrode active material capable of substituting the carbon material having low capacity is required. For this purpose, research into using metal (metalloid) exhibiting charge and discharge capacity higher than that of the carbon material and electrochemically alloyable with lithium, e.g., silicon (Si) and tin (Sn), as an electrode active material has been conducted.

However, the metal (metalloid)-based electrode active material has high changes in volume accompanying charge and discharge of lithium and thus, cracks and pulverization may be generated. Therefore, capacity of the battery may rapidly decrease and cycle lifetime may decrease as charge and discharge cycles are performed.

SUMMARY OF THE INVENTION

An aspect of the present invention provides an electrode active material for a secondary battery able to prevent generation of cracks and pulverization through reducing volume changes despite of using metal (metalloid) oxide, such as silica, as an electrode active material as well as having improved lifetime characteristics and a low thickness change rate.

According to an aspect of the present invention, there is provided a porous electrode active material including silicon-based oxide expressed by $SiO_x$ (0.5≤x≤1.2) and having a Brunauer, Emmett, and Teller (BET) specific surface area ranging from 2 $m^2/g$ to 100 $m^2/g$.

According to another aspect of the present invention, there is provided a secondary battery including a cathode including a cathode active material; a separator; an anode including an anode active material; and an electrolyte, wherein the anode active material includes a porous electrode active material including silicon-based oxide expressed by $SiO_x$ (0.5≤x≤1.2) and having a BET specific surface area ranging from 2 $m^2/g$ to 100 $m^2/g$.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
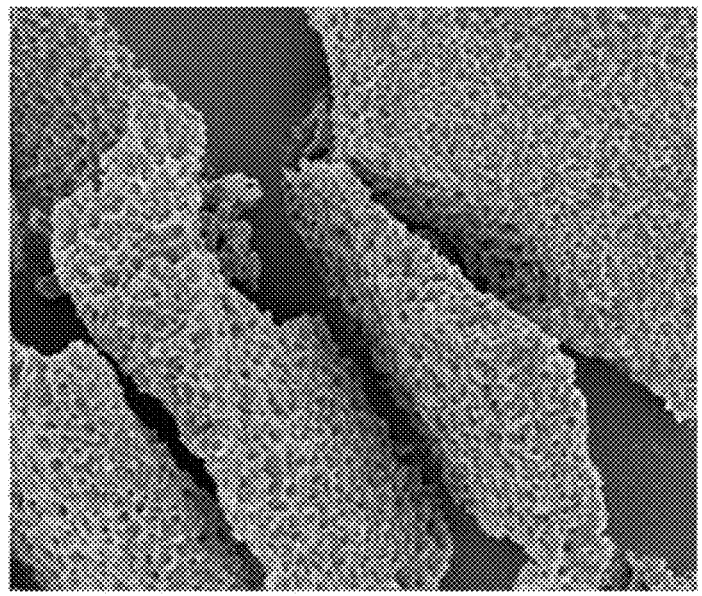
FIG. 1 is a scanning electron microscope (SEM) photograph of porous SiO according to an embodiment of the present invention.
Figure 1:
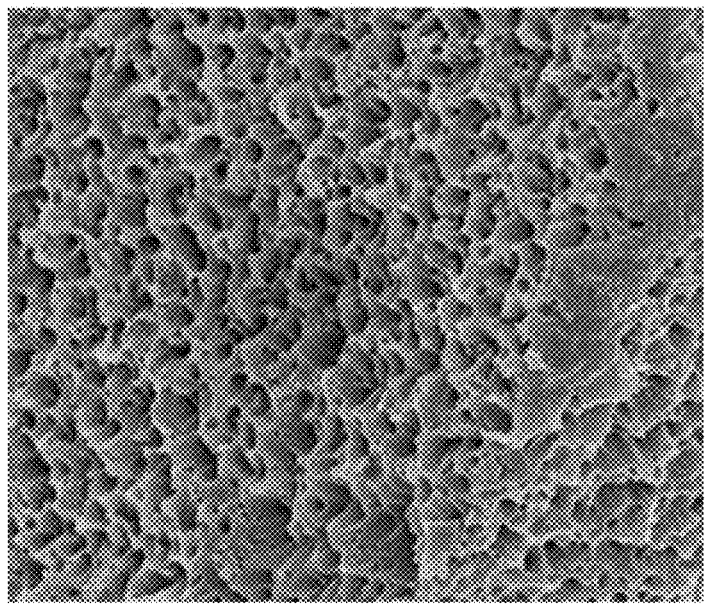

The present invention provides a porous electrode active material including silicon-based oxide expressed by SiO (0.5≤x≤1.2) and having a Brunauer, Emmett, and Teller (BET) specific surface area ranging from 2 $m^2/g$ to 100 $m^2/g$.

Hereinafter, the present invention will be described in detail.

An electrode active material according to an embodiment of the present invention includes pores and siliconbased oxide expressed by $SiO_x$ (0.5≤x≤1.2). More particularly, the electrode active material may have a BET specific surface area ranging from 2 $m^2/g$ to 100 $m^2/g$, may include a porosity ranging from 5% to 90% of a total volume of the electrode active material, and is particles having pores in a honeycomb shape formed at least on surfaces thereof. In the case that the BET specific surface area or porosity of the electrode active material is less than a lower limit value, volume expansion of $SiO_x$ during charge and discharge may not be prevented, and in the case that the BET specific surface area or porosity of the electrode active material is greater than an upper limit value, mechanical strength may be decreased due to a large amount of pores existing in $SiO_x$ and thus, $SiO_x$ may be destroyed during preparation processes (slurry mixing, pressing after coating, etc.) of a battery.

Also, in the electrode active material according to the embodiment of the present invention, x in $SiO_x$ may be in a range of 0.5 to 1.2 and x may be 1. In the case that x is less than 0.5, initial efficiency may be high, but an amount of oxygen able to inhibit volume expansion may be low, and thus, lifetime and inhibition of thickness expansion may decrease despite of forming a porous structure. In the case that x is greater than 1.2, the initial efficiency may decrease due to an increase in the amount of oxygen.

The electrode active material according to the embodiment of the present invention may be coated with carbon in order to improve battery performance of a secondary battery.

In the case of using the silicon-based oxide according to the embodiment of the present invention as an electrode active material, an irreversible phase, such as lithium oxide or lithium silicon oxide, is formed due to a reaction between lithium ions (Li⁺) inserted into an anode and silicon-based oxide during initial charge and discharge of a battery, and at this time, since the irreversible phase surrounds silicon in the silicon oxide, less cracks or pulverization are generated. Also, since pores exist at least on the surface or both the surface and the inside of the electrode active material, capacity of the battery may be improved and volume changes generated during charge and discharge may be effectively controlled, and thus, improved lifetime may be obtained. The electrode active material according to the embodiment of the present invention may be used as both cathode active material and anode active material, but may be an anode active material.

Further, the present invention provides a method of preparing an electrode active material including: mixing a fluorine-based solution and a metal precursor solution and then allowing $SiO_x$ ($0.5 \leq x \leq 1.2$)-containing particles to be in contact therewith to electrodeposit metal particles on surfaces of the $SiO_x$-containing particles; etching the $SiO_x$-containing particles by allowing the $SiO_x$-containing particles having metal particles electrodeposited thereon to be in contact with an etching solution; and removing the metal particles by allowing the etched $SiO_x$-containing particles to be in contact with a metal removing solution.

The method of preparing an electrode active material according to an embodiment of the present invention may form pores without changing a crystal structure of the $SiO_x$ ($0.5 \leq x \leq 1.2$)-containing particles.

The method of preparing an electrode active material according to the embodiment of the present invention includes mixing a fluorine-based solution and a metal precursor solution and then allowing $SiO_x$-containing particles to be in contact therewith to electrodeposit metal particles in the metal precursor solution on the $SiO_x$-containing particles. At this time, the $SiO_x$-containing particles emit electrons due to the fluorine-based solution and metal ions in the solution receive electrons to be reduced and electrodeposited on the surfaces of the $SiO_x$-containing particles. Once the metal particles are electrodeposited on the surface of the $SiO_x$-containing particles, continuous electrodeposition may be generated as the metal particle itself becomes a catalyst site.

The fluorine-based solution used may be one or more selected from the group consisting of hydrogen fluoride (HF), silicon fluoride ($H_2SiF_6$), and ammonium fluoride ($NH_4F$), and the metal precursor solution may include one or more selected from the group consisting of silver (Ag), gold (Au), platinum (Pt), and copper (Cu). The fluorine-based solution and the metal precursor solution may be mixed at a volume ratio ranging from 10:90 to 90:10. In the case that the volume ratio of the fluorine-based solution included is less than 10, an amount of the metal precursor formed on the surfaces of the $SiO_x$-containing particles may be small and a reaction rate may be very slow, and thus, a preparation time may increase. In the case that the volume ratio of the fluorine-based solution included is greater than 90, formation speed of the metal precursor may be very fast, and thus, uniform and small-sized metal particles may not be electrodeposited on the surfaces of the $SiO_x$-containing particles.

Also, an amount of the metal particles electrodeposited on the $SiO_x$-containing particles may be controlled according to a concentration of the fluorine-based solution and a contact time of the $SiO_x$-containing particles with the metal precursor solution. A content of the contacted $SiO_x$-containing particles may be in a range of 0.001 to 50 parts by weight based on 100 parts by weight of a mixed solution of the fluorine-based solution and the metal precursor solution.

The method of preparing an electrode active material according to the embodiment of the present invention includes etching the $SiO_x$-containing particles by allowing the $SiO_x$-containing particles having metal particles electrodeposited thereon to be in contact with an etching solution. Nanopores, mesopores, and macropores are formed in the $SiO_x$-containing particles through the etching process.

Metal particles are oxidized by $H_2O_2$ and become metal ions, the $SiO_x$-containing particles are continuously dissolved while electrons are transferred from the $SiO_x$-containing particles to the metal particles at interfaces between the $SiO_x$-containing particles and the metal particles, and reduction of metal ions oxidized from the metal particles electrodeposited on the surfaces of the foregoing $SiO_x$-containing particles is generated. According to the foregoing method, the $SiO_x$-containing particles in contact with the metal particles may be continuously etched to form a porous structure having a honeycomb shape at least on the surface thereof, and a size of the metal particles may increase because the metal particles have a strong tendency to agglomerate with adjacent metal particles in the etching solution during etching.

A mixed solution of hydrogen fluoride (HF) solution and hydrogen peroxide ($H_2O_2$) solution may be used as the etching solution and an amount of the hydrogen fluoride solution may vary according to a degree of etching. However, the hydrogen fluoride solution and the hydrogen peroxide solution may be mixed at a volume ratio ranging from 10:90 to 90:10. At this time, a content of $H_2O_2$ plays an important role in forming mesopores in the $SiO_x$-containing particles and an oxidized amount of the metal particles is determined by a concentration of $H_2O_2$ and thus, a concentration of the metal ions may be determined. The metal particles become metal ions by $H_2O_2$, the metal ions begin to adhere to specific defective sites (e.g., portions having $SiO_x$ etched therefrom), and mesopores are formed by etching under the $SiO_x$-containing particles having metal adhered thereto.

Also, the etching may be performed for 30 minutes to 5 hours. In the case that the etching is performed less than 30 minutes, the formation of pores in the $SiO_x$-containing particles may be insignificant, and in the case that the etching is performed greater than 5 hours, the $SiO_x$-containing particles are excessively etched and thus, mechanical properties of the $SiO_x$-containing particles may be degraded.

The method of preparing an electrode active material according to the embodiment of the present invention includes removing the metal particles by allowing the etched $SiO_x$-containing particles to be in contact with a metal removing solution, and may prepare particles having pores in a honeycomb shape formed at least on the surface of the $SiO_x$-containing particles.

The metal removing solution used may be one or more selected from the group consisting of nitric acid ($HNO_3$), sulfuric acid ($H_2SO_4$), and hydrochloric acid (HCl).

The electrode active material prepared according to the preparation method of the present invention may be used as both cathode active material and anode active material, but may be used as an anode active material.

Also, the present invention provides a secondary battery including a cathode including a cathode active material; a separator; an anode including an anode active material; and an electrolyte, in which the anode active material includes a porous electrode active material including silicon-based oxide expressed by $SiO_x$ ($0.5 \leq x \leq 1.2$) and having a BET specific surface area ranging from 2 $m^2/g$ to 100 $m^2/g$.

At this time, the anode active material may have a porosity ranging from 5% to 90%, may include pores having a honeycomb shape at least on the surface thereof, and the $SiO_x$ may be silicon monoxide in which x is 1.

The anode active material according to the embodiment of the present invention may be used in a secondary battery by mixing with a typically used anode active material, and the typically used anode active material may be one or more selected from the group consisting of graphite, soft carbon, hard carbon, and lithium titanium oxide.

The prepared electrode active material, specifically an anode active material, may be prepared as an anode by using a preparation method typically used in the art. For example, the anode active material of the present invention is mixed and stirred with a binder, a solvent, and a conductive material and a dispersant if necessary to prepare slurry, and then an anode may be prepared by coating a collector with the slurry and pressing.

Examples of the binder may be a vinylidene fluoride-hexafluoropropylene copolymer (PVDF-co-HEP), polyvinylidene fluoride, polyacrylonitrile, polymethylmethacrylate, polyvinyl alcohol, carboxymethyl cellulose (CMC), starch, hydroxypropyl cellulose, regenerated cellulose, polyvinylpyrrolidone, tetrafluoroethylene, polyethylene, polypropylene, polyacrylate, a ethylene-propylene-diene monomer (EPDM), a sulfonated EPDM, a styrene-butadiene rubber (SBR), a fluoro rubber, and various copolymers.

N-methyl-2-pyrrolidone, acetone, or water may be used as the solvent.

The conductive material is not particularly limited so long as it does not cause chemical changes in the battery and has conductivity. For example, graphite such as natural graphite or artificial graphite; carbon black such as acetylene black, Ketjen black, channel black, furnace black, lamp black, and thermal black; conductive fibers such as carbon fibers or metal fibers; metal powders such as fluoro carbon powder, aluminum powder, and nickel powder; conductive whiskers such as zinc oxide whiskers and potassium titanate whiskers; conductive metal oxides such as titanium oxide; and conductive materials such as polyphenylene derivatives may be used as the conductive material.

An aqueous-based dispersant or an organic dispersant such as N-methyl-2-pyrrolidone may be used as the dispersant.

Similar to the preparation of the foregoing anode, a cathode active material, a conductive material, a binder, and a solvent are mixed to prepare a slurry, and then a cathode may be prepared by directly coating a metal collector with the slurry or by casting the slurry on a separate support and laminating a cathode active material film separated from the support on a metal collector.

Examples of the cathode active material may be a layered compound, such as lithium cobalt oxide ($LiCoO_2$) or lithium nickel oxide ($LiNiO_2$), or a compound substituted with one or more transition metals; lithium manganese oxides such as $Li_{1+y}Mn_{2-y}O_4$ (where y is 0 to 0.33), $LiMnO_3$, $LiMn_2O_3$, and $LiMnO_2$; lithium copper oxide ($Li_2CuO_2$); vanadium oxides such as $LiV_3O_8$, $LiFe_3O_4$, $V_2O_5$, and $Cu_2V_2O_7$; nickel (Ni)-site type lithium nickel oxide expressed by a chemical formula of $LiNi_{1-y}M_yO_2$ (where M is cobalt (Co), manganese (Mn), aluminum (Al), copper (Cu), iron (Fe), magnesium (Mg), boron (B), or gallium (Ga), and y is 0.01 to 0.3); lithium manganese complex oxide expressed by a chemical formula of $LiMn_{2-y}M_yO_2$ (where M is Co, Ni, Fe, chromium (Cr), zinc (Zn), or tantalum (Ta), and y is 0.01 to 0.1) or $Li_2Mn_3MO_8$ (where M is Fe, Co, Ni, Cu, or Zn); $LiMn_2O_4$ having a part of lithium (Li) being substituted with an alkaline earth metal ion; a disulfide compound; and $Fe_2(MoO_4)_3$. However, the cathode active material is not limited thereto.

A typical porous polymer film used as a typical separator, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, may be used alone or in a lamination therewith as the separator. A typical porous nonwoven fabric, for example, a nonwoven fabric formed of high melting point glass fibers or polyethylene terephthalate fibers may be used, but the separator is not limited thereto.

In an electrolyte solution used in the present invention, a lithium salt, which may be included as an electrolyte, may be used without limitation so long as it is typically used in an electrolyte solution for a secondary battery. For example, one selected from the group consisting of $F^-$, $Cl^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$ may be used as an anion of the lithium salt.

In the electrolyte solution used in the present invention, an organic solvent included in the electrolyte solution may be used without limitation so long as it is typically used, and typically, one or more selected from the group consisting of propylene carbonate, ethylene carbonate, diethyl carbonate, dimethyl carbonate, ethylmethyl carbonate, methylpropyl carbonate, dipropyl carbonate, dimethyl sulfoxide, acetonitrile, dimethoxyethane, diethoxyethane, vinylene carbonate, sulfolane, γ-butyrolactone, propylene sulfite, and tetrahydrofuran may be used.

In particular, ethylene carbonate and propylene carbonate, ring-type carbonates among the carbonate-based organic solvents, well dissociate the lithium salt in the electrolyte solution due to high dielectric constants as high-viscosity organic solvents, and thus, the ring-type carbonate may be used. Since an electrolyte solution having high electrical conductivity may be prepared when the ring-type carbonate is mixed with low-viscosity, low-dielectric constant linear carbonate, such as dimethyl carbonate and diethyl carbonate, in an appropriate ratio, and thus, the ring-type carbonate, for example, may be used.

Selectively, the electrolyte solution stored according to the present invention may further include an additive, such as an overcharge inhibitor, included in a typical electrolyte solution.

A separator is disposed between the cathode and the anode to form a battery structure, the battery structure is wound or folded to put in a cylindrical battery case or prismatic battery case, and then a secondary battery is completed when the electrolyte is injected thereinto. Also, the battery structure is stacked in a bi-cell structure and then impregnated with the electrolyte solution, and a secondary battery is completed when the product thus obtained is put in a pouch and sealed.

Hereinafter, the present invention will be described in detail according to specific examples. The invention may, however, be embodied in many different forms and should not be construed as being limited to the embodiments set forth herein.

EXAMPLE 1

Preparation of Porous SiO 1

1. Electrodeposition of Ag on Surfaces of SiO Particles
300 ml of a solution having 10% of hydrogen fluoride (HF) and 300 ml of a solution having 10 mM of silver nitrate (AgNO$_3$) were mixed for 10 minutes. 2g of silicon monoxide (SiO) was added to the solution having hydrogen fluoride and silver nitrate mixed therein and the solution was mixed for 5 minutes, and then SiO having silver (Ag) electrodeposited thereon was prepared by filtering, washing, and drying the mixture.

2. Chemical Etching 200 ml of a solution having 5% of hydrogen fluoride and 100 ml of a solution having 1.5 wt% of hydrogen peroxide (H$_2$O$_2$) added therein were mixed for 10 minutes. SiO having Ag particles electrodeposited thereon was added to the etching solution having hydrogen fluoride and hydrogen peroxide mixed therein and mixed for 30 minutes, and then porous SiO was prepared by filtering, washing, and drying the mixture.

3. Ag Removal 100 ml of 60% nitric acid (HNO3) was heated to 50° C. and the porous SiO was then added thereto and mixed for 2 hours. A porous SiO for an anode active material having Ag removed therefrom was prepared by filtering, washing, and drying the mixture.

EXAMPLE 2

Preparation of Porous SiO 2

An anode active material was prepared in the same manner as Example 1 except that SiO having Ag electrodeposited thereon was added to the etching solution having hydrogen fluoride and hydrogen peroxide mixed therein and mixed for 2 hours.

EXAMPLE 3

Preparation of Porous SiO 3

An anode active material was prepared in the same manner as Example 1 except that SiO having Ag electrodeposited thereon was added to the etching solution having hydrogen fluoride and hydrogen peroxide mixed therein and mixed for 5 hours.

EXAMPLE 4

Preparation of Secondary Battery 1

The porous SiO prepared in Example 1 as an anode active material, acetylene black as a conductive material, and polyvinylidene fluoride as a binder were mixed at a weight ratio of 88:2:10 and the mixture was mixed with a N-methyl-2-pyrrolidone solvent to prepare a slurry. One surface of a copper collector was coated with the prepared slurry to a thickness of 65 μm, dried and rolled, and then an anode was prepared by punching into a predetermined size.

LiPF$_6$ was added to a non-aqueous electrolyte solvent prepared by mixing ethylene carbonate and diethyl carbonate at a volume ratio of 30:70 to prepare a 1 M LiPF$_6$ non-aqueous electrolyte solution.

A lithium foil was used as a counter electrode and a polyolefin separator was disposed between both electrodes, and then a coin type secondary battery was prepared by injecting the electrolyte solution.

EXAMPLE 5

Preparation of Secondary Battery 2

A coin type secondary battery was prepared in the same manner as Example 4 except that the porous SiO prepared in Example 2 was used as an anode active material.

EXAMPLE 6

Preparation of Secondary Battery 3

A coin type secondary battery was prepared in the same manner as Example 4 except that the porous SiO prepared in Example 3 was used as an anode active material.

COMPARATIVE EXAMPLE 1

A coin type secondary battery was prepared in the same manner as Example 4 except that non-porous SiO (bare SiO) was used as an anode active material.

COMPARATIVE EXAMPLE 2

A coin type secondary battery was prepared in the same manner as Example 4 except that Si having a porosity of 13% was used.

COMPARATIVE EXAMPLE 3

A coin type secondary battery was prepared in the same manner as Example 4 except that Si having a porosity of 35% was used.

COMPARATIVE EXAMPLE 4

A coin type secondary battery was prepared in the same manner as Example 4 except that Si having a porosity of 75% was used.

EXPERIMENTAL EXAMPLE 1

Analysis on Shape and Crystal Structure of Porous SiO

Figure 2:
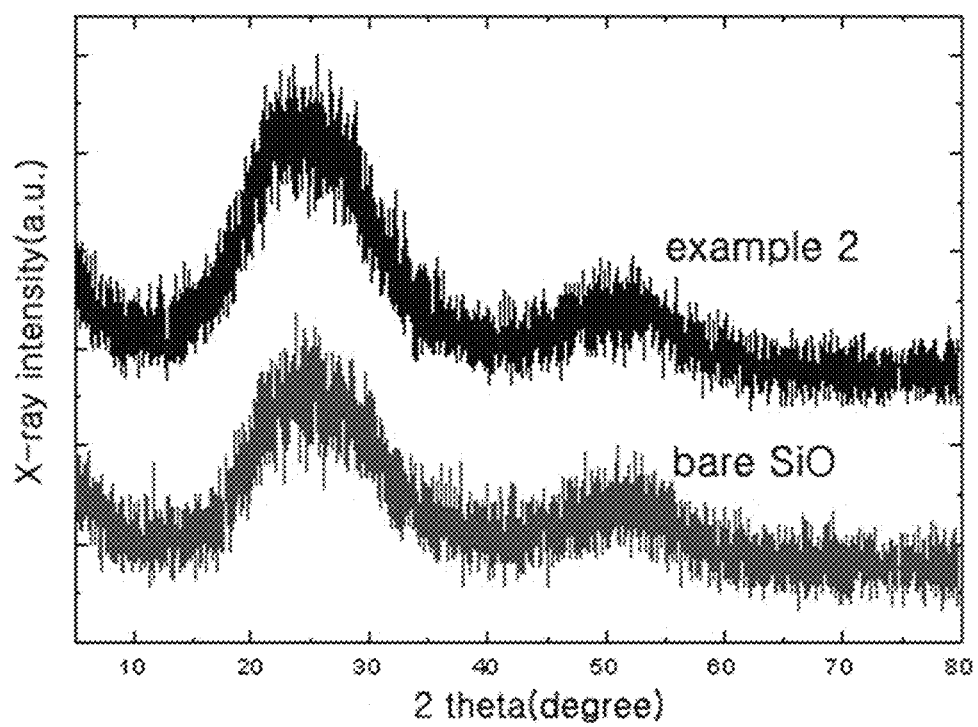
FIG. 2 is a graph showing results of X-ray diffraction (XRD) analysis on porous SiO according to the embodiment of the present invention and typical SiO.

Scanning electron microscope (SEM) and X-ray diffraction (XRD) were used in order to analyze shape and crystal structure of porous SiO according to the embodiment of the present invention, and the results thereof are presented in FIGS. 1 and 2.

As shown in FIG. 1, it may be confirmed that a plurality of pores in a honeycomb shape was formed on the surface and the inside of the porous SiO (Example 2) according to the embodiment of the present invention (FIG. 1(b) is an enlarged view of FIG. 1(a)).

Also, as shown in FIG. 2, it may be understood that the porous SiO (Example 2) according to the embodiment of the present invention and SiO (bare SiO) had the same crystal structure, and accordingly, it may be understood that the porous SiO of the present invention has the same composition and crystal structure as those of raw material SiO and Ag was completely removed therefrom.

EXPERIMENTAL EXAMPLE 2

Evaluation of Porosity, BET Specific Surface Area, Lifetime Characteristics, and Thickness Change Rate of Secondary Battery The following experiments were performed in order to investigate porosities, Brunauer, Emmett, and Teller (BET) specific surface areas, lifetime characteristics, and thickness change rates of the coin type secondary batteries prepared in Examples 4 to 6 and Comparative Examples 1 to 4.

In order to investigate charge and discharge characteristics of the secondary batteries, coin type secondary batteries prepared in Examples 4 to 6 and Comparative Examples 1 to 4 were charged to 5 mV at a constant current, and then charged until the current reaches 0.005 C at 5 mV and the charging was terminated. Discharge of the batteries was performed to 1.0 V at a constant current.

BET specific surface areas were calculated by allowing nitrogen ($N_2$) to be adsorbed on surfaces of the porous SiO of Examples 1 to 3 and the Si of Comparative Examples 1 to 4 and measuring amounts of adsorbed nitrogen gas. Charge and discharge were performed at 0.5 C after a third cycle and lifetime characteristics of the battery were calculated by measuring a ratio of discharge capacity of a 49th cycle to discharge capacity of a first cycle.

Each coin type secondary battery was disassembled in a charge state of a 50th cycle and a thickness change rate was calculated by measuring difference in thicknesses of an electrode after the 50th cycle and before a charge cycle.

The following Table 1 presents porosities, discharge capacities, initial efficiencies, lifetime characteristics, and thickness change rates of the coin type secondary batteries prepared in Examples 4 to 6 and Comparative Examples 1 to 4.

TABLE 1

| Examples | Porosity (%) | BET ($m^2$/g) | Lifetime characteristics (%) | Thickness change rate (%) |
|---|---|---|---|---|
| Example 4 | 11 | 12.5 | 88 | 157 |
| Example 5 | 38 | 42.8 | 96 | 86 |
| Example 6 | 72 | 98.3 | 99 | 43 |
| Comparative Example 1 | 0 | 2.1 | 85 | 194 |
| Comparative Example 2 | 13 | 14.3 | 32 | 653 |
| Comparative Example 3 | 35 | 37.1 | 42 | 580 |
| Comparative Example 4 | 75 | 99.5 | 67 | 427 |

Lifetime characteristics: (discharge capacity of the 49th cycle/discharge capacity of the first cycle)×100
Thickness change rate: (electrode thickness after the 50th cycle−electrode thickness before a cycle)/electrode thickness before a cycle×100

As shown in Table 1, it may be understood that lifetime characteristics of the batteries prepared in Examples 4 to 6 according to the present invention were improved from a minimum of 3% to a maximum of 67% in comparison to those of the batteries prepared in Comparative Examples 1 to 4, and it may be also understood that the difference in thickness change rates ranged from a minimum of 37% to a maximum of 610%. It may be understood that the electrode active material according to the present invention, different from typical Si, included oxygen and a plurality of pores, and thus, lifetime characteristics and thickness change rate were greatly improved.

In the present invention, since pores are formed on surface and inside of silicon-based oxide by physically controlling a crystal structure without changing the crystal structure, a secondary battery not only has high capacity but volume changes generated during charge and discharge are also effectively controlled. Therefore, volume changes are small and lifetime characteristics are excellent.

While the present invention has been shown and described in connection with the exemplary embodiments, it will be apparent to those skilled in the art that modifications and variations can be made without departing from the spirit and scope of the invention as defined by the appended claims.

What is claimed is:

1. A method of preparing a porous electrode active material comprising silicon-based oxide expressed by $SiO_x$ (0.5≤x≤1.2) and having a Brunauer, Emmett, and Teller (BET) specific surface area ranging from 42.8 $m^2$/g to 100 $m^2$/g, wherein porosity is in a range of from 38% to 90%, and wherein pores in a honeycomb shape are included at least on a surface of the porous electrode active material, the method comprising:
    electrodepositing metal particles on surfaces of the $SiO_x$ (0.5≤x≤1.2) particles in a mixed solution of a fluorine-based solution and a metal precursor solution, wherein an amount of the $SiO_x$ particles is present in a range of 0.001 to 50 parts by weight based on 100 parts by weight of the mixed solution;
    etching the surface of the $SiO_x$ particles under the metal particles electrodeposited thereon in an etching solution for a period ranging from 2 hours to 5 hours, wherein the etching solution includes hydrogen fluoride (HF) and hydrogen peroxide ($H_2O_2$) mixed at a volume ratio ranging from 10:90 to 90:10; and
    removing the metal particles from the etched $SiO_x$ particles in a metal removing solution.

2. The method of claim 1, wherein the fluorine-based solution includes one or more selected from the group consisting of hydrogen fluoride (HF), silicon fluoride ($H_2SiF_6$), and ammonium fluoride ($NH_4F$).

3. The method of claim 1, wherein the metal precursor solution comprises one or more selected from the group consisting of silver (Ag), gold (Au), platinum (Pt), and copper (Cu).

4. The method of claim 1, wherein the fluorine-based solution and the metal precursor solution are present in the mixed solution at a volume ratio ranging from 10:90 to 90:10.

5. The method of claim 1, wherein the metal removing solution is one or more selected from the group consisting of nitric acid ($HNO_3$), sulfuric acid ($H_2SO_4$), and hydrochloric acid (HCl).

* * * * *